US012258792B1

(12) United States Patent
Kelsch et al.

(10) Patent No.: US 12,258,792 B1
(45) Date of Patent: Mar. 25, 2025

(54) NON-OBTRUSIVE ANTI-THEFT DEVICE FOR SECURING MERCHANDISE AGAINST THEFT

(71) Applicants: Christopher A. Kelsch, Palm Harbor, FL (US); Vanguard Products Group, Inc., Palm Harbor, FL (US)

(72) Inventors: Christopher A. Kelsch, Palm Harbor, FL (US); Wade Zhu, Land O' Lakes, FL (US); Lee Eckert, Sarasota, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 443 days.

(21) Appl. No.: 17/707,512

(22) Filed: Mar. 29, 2022

Related U.S. Application Data

(60) Provisional application No. 63/167,420, filed on Mar. 29, 2021.

(51) Int. Cl.
*E05B 73/00* (2006.01)

(52) U.S. Cl.
CPC ................................ *E05B 73/0082* (2013.01)

(58) Field of Classification Search
CPC ............. E05B 73/0005; E05B 73/0017; E05B 73/0023; E05B 73/0082
See application file for complete search history.

(56) References Cited

U.S. PATENT DOCUMENTS

| | | | | |
|---|---|---|---|---|
| 11,122,917 B2 * | 9/2021 | Chapuis | F16M 11/041 | |
| 11,178,983 B1 * | 11/2021 | Kelsch | A47F 7/024 | |
| 11,236,528 B2 * | 2/2022 | Berglund | E05B 73/0017 | |
| 11,553,790 B2 * | 1/2023 | Gulick | F16M 13/022 | |
| 11,680,428 B2 * | 6/2023 | Chapuis | F16M 11/22 | 248/551 |
| 11,739,568 B2 * | 8/2023 | Penny | G06F 1/166 | 248/551 |
| 12,049,981 B2 * | 7/2024 | Horvath | F16M 11/105 | |
| 2023/0313568 A1 * | 10/2023 | Gulick, Jr. | G06F 1/1618 | 248/551 |

* cited by examiner

*Primary Examiner* — Christine M Mills
*Assistant Examiner* — Noah Horowitz
(74) *Attorney, Agent, or Firm* — Andriy Lytvyn; Hill Ward Henderson, P.A.

(57) ABSTRACT

An anti-theft device for securing an article of merchandise against unauthorized removal from a display counter. The anti-theft device includes two mating bracket members. Each bracket member includes a lip configured to engage a front surface of the merchandise and a back surface configured to engage the rear surface of the merchandise. The bracket members are also configured to engage two or more lateral sides of the merchandise, while leaving at least one lateral side unobstructed. At least one of the bracket members has an aperture configured to receive a protruding feature of the merchandise. The bracket members are configured to be placed onto the merchandise separately and then coupled together. When the brackets are in their coupled configuration and the protruding feature of the merchandise resides within the corresponding aperture, the merchandise is fully immobilized against all movement relative to the anti-theft device.

16 Claims, 12 Drawing Sheets

NON-OBTRUSIVE ANTI-THEFT DEVICE FOR SECURING MERCHANDISE AGAINST THEFT

PRIORITY CLAIM

This non-provisional patent application is a continuation of and claims priority to U.S. Provisional Patent Application No. 63/167,420, filed on Mar. 29, 2021, which is incorporated herein by reference.

BACKGROUND OF THE INVENTION

1. Field of the Invention

This invention relates to merchandise anti-theft devices. More specifically, it relates to a non-obtrusive anti-theft device for securing merchandise against theft, while leaving at least one lateral side of the merchandise unobstructed.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma pertaining to how to interactively display their merchandise to attract customers and increase sales, while, at the same time, safeguarding the merchandise against theft.

Currently available anti-theft solutions generally involve obtrusive and aesthetically unattractive devices such as bulky brackets, steel cables, locks, and casings. Although these security measures may effectively protect against theft, they have a negative effect on the consumer shopping experience by discouraging interaction with products and may ruin the overall ambiance of a retail store. Furthermore, anti-theft devices for electronic merchandise, such as smartphones and tablets, must not interfere with the functional features of the merchandise.

Traditional anti-theft brackets retain merchandise by at least partially capturing all four lateral sides thereof, thereby immobilizing the merchandise within the bracket. This type of anti-theft device, however, is not suitable to secure foldable, rollable, or expandable electronic gadgets. Because traditional anti-theft devices capture all lateral sides of the electronic gadget, such traditional anti-theft device would interfere with the hinge or other type of expandable mechanism of the merchandise. Thus, what is needed is a non-obtrusive anti-theft bracket configured to immobilize merchandise while leaving at least one of its lateral edges unobstructed.

SUMMARY OF THE INVENTION

The unresolved need stated above is now met by a novel and non-obvious invention disclosed and claimed herein. In an embodiment, the invention pertains to an anti-theft device for securing an article of merchandise—for example, an electronic gadget such as a smartphone or a tablet. The anti-theft device is especially adapted for securement of foldable, rollable, or expandable electronic gadgets, although the applications of the anti-theft device are not limited to these types of articles of merchandise.

In an embodiment, the anti-theft device comprises a two-part bracket assembly having a first bracket member and a second bracket member. The first bracket member has a first lip configured to receive a lateral side of the article of merchandise. When the lip of the first bracket member receives a lateral side of the article of merchandise, the first bracket member contacts both a back surface and a front surface of the article of merchandise.

The first bracket member further has an aperture configured to receive a protruding feature (for example, a camera lens module) of the article of merchandise. Engagement between the outer contour of the protruding feature and the inner contour of the aperture immobilized article of merchandise against relative movement with respect to the first bracket member in a plane parallel to a front and back surfaces of the article of merchandise. To achieve a precise alignment and fit between the protruding feature of the article of merchandise and the aperture of the bracket assembly, the bracket assembly may be custom-made to correspond to the exact dimensions and shape of the specific article of merchandise being secured.

The second bracket member has a second lip. The second lip is configured to receive a second lateral side of the article of merchandise therein such that the second bracket member contacts both the back surface and the front surface of the article of merchandise. The first lip of the first bracket member and the second lip of the second bracket member may be configured to engage opposite lateral sides of the article of merchandise.

To secure the article of merchandise, the first bracket member is coupled to the article of merchandise by receiving the first lateral side thereof into the first lip and receiving the protruding feature of the article of merchandise into the first aperture. The second bracket member is coupled to the article of merchandise by receiving the second lateral side of the article of merchandise into the second lip. Next, the first and the second bracket members are configured to be coupled together forming a bracket assembly, whereby the bracket assembly immobilizes the article of merchandise therein. The first and second bracket members can be retained in the coupled configuration using fasteners. To release the article of merchandise from the bracket assembly, the first and the second bracket members must be decoupled from one another.

In an embodiment, the article of merchandise has four lateral sides—top, bottom, left, and right—and when the bracket assembly is coupled to the article of merchandise, at least one of four lateral sides is unobstructed by the bracket assembly. The unobstructed lateral side may have a hinge, or another type of mechanical connector, configured to enable the article of merchandise to transition between a closed configuration and an open or expanded configuration.

The first bracket member and/or the second bracket member may comprise an additional aperture configured to receive a cable coupled to the article of merchandise. The engagement between the cable connector and the additional aperture may be utilized to further immobilize the article of merchandise relative the bracket assembly.

Furthermore, the first bracket member may include a first mounting block part and the second bracket member may include a complementary second mounting block part. When the first and the second bracket members are coupled together, the first and the second mounting block parts collectively form a mounting block, which may be used to couple the bracket assembly to a pedestal. The mounting block may be centered relative to the bracket assembly to enable centered display of the article of merchandise in a closed or folded configuration. Alternatively, the mounting block may be offset relative to the bracket assembly, enabling centered display of the article of merchandise in an opened or expanded configuration.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
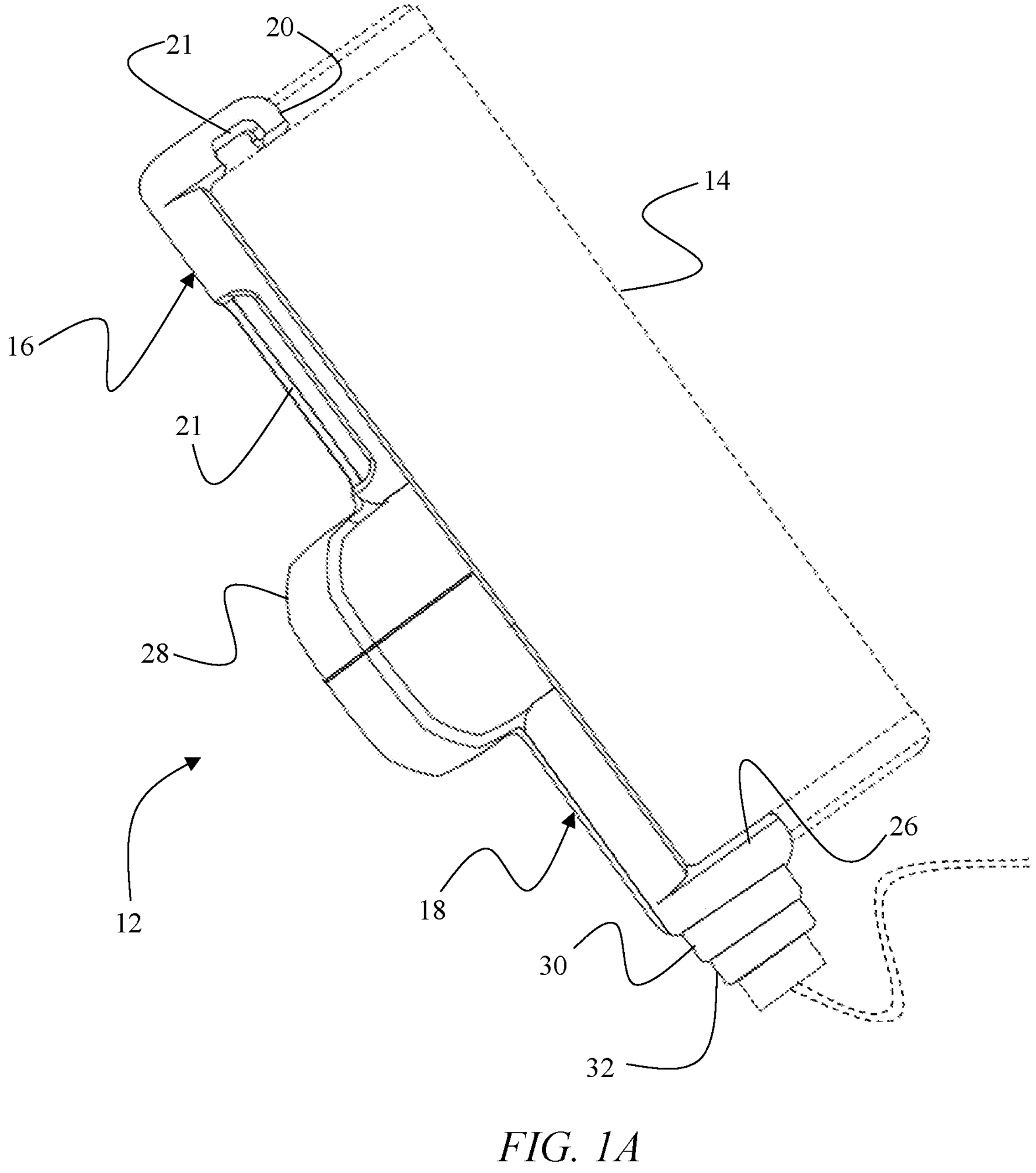
FIG. 1A is a perspective front view of a first embodiment of the anti-theft device securing an article of merchandise.
Figure 1B:
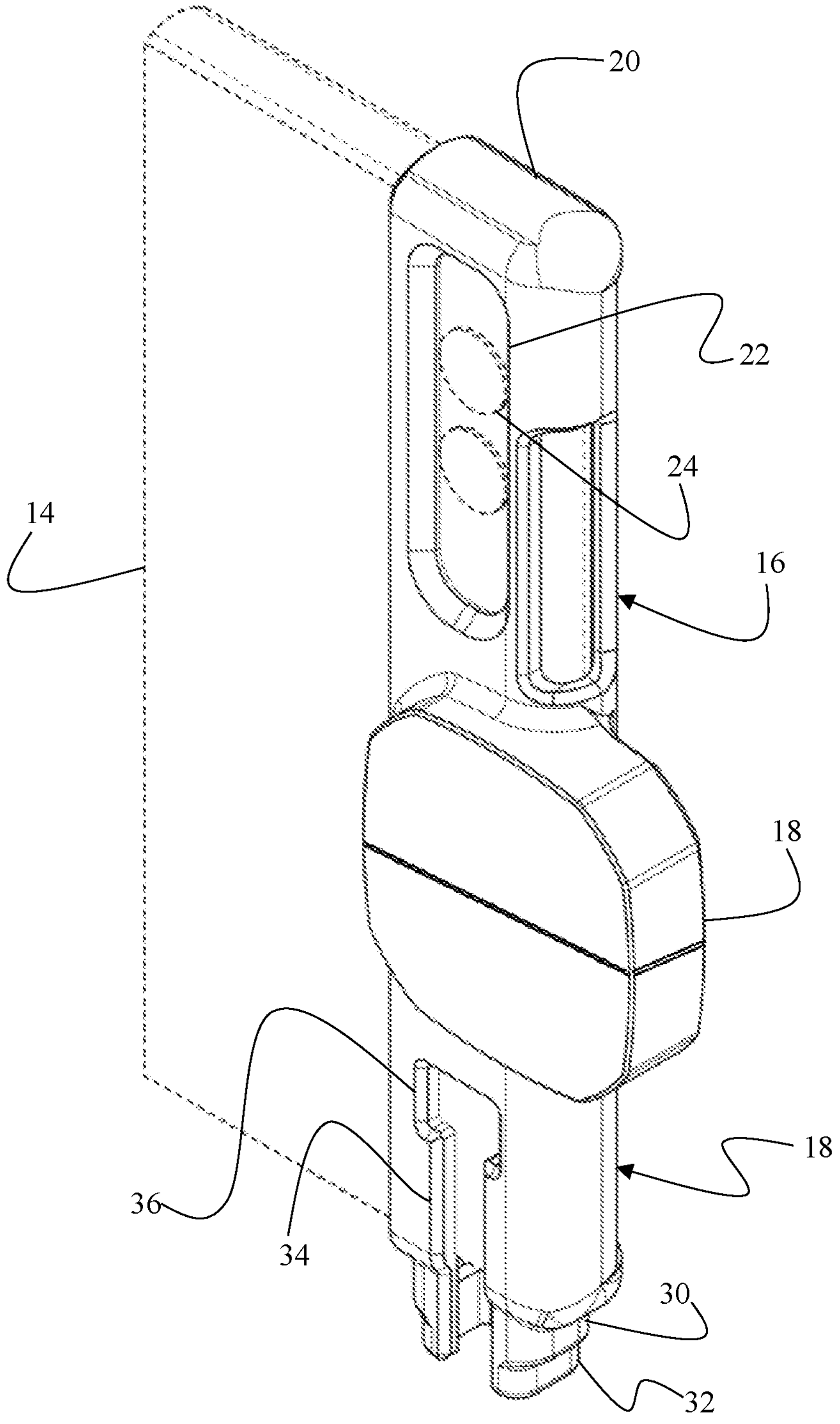
FIG. 1B is a perspective back view of the first embodiment of the anti-theft device securing the article of merchandise.
Figure 2A:
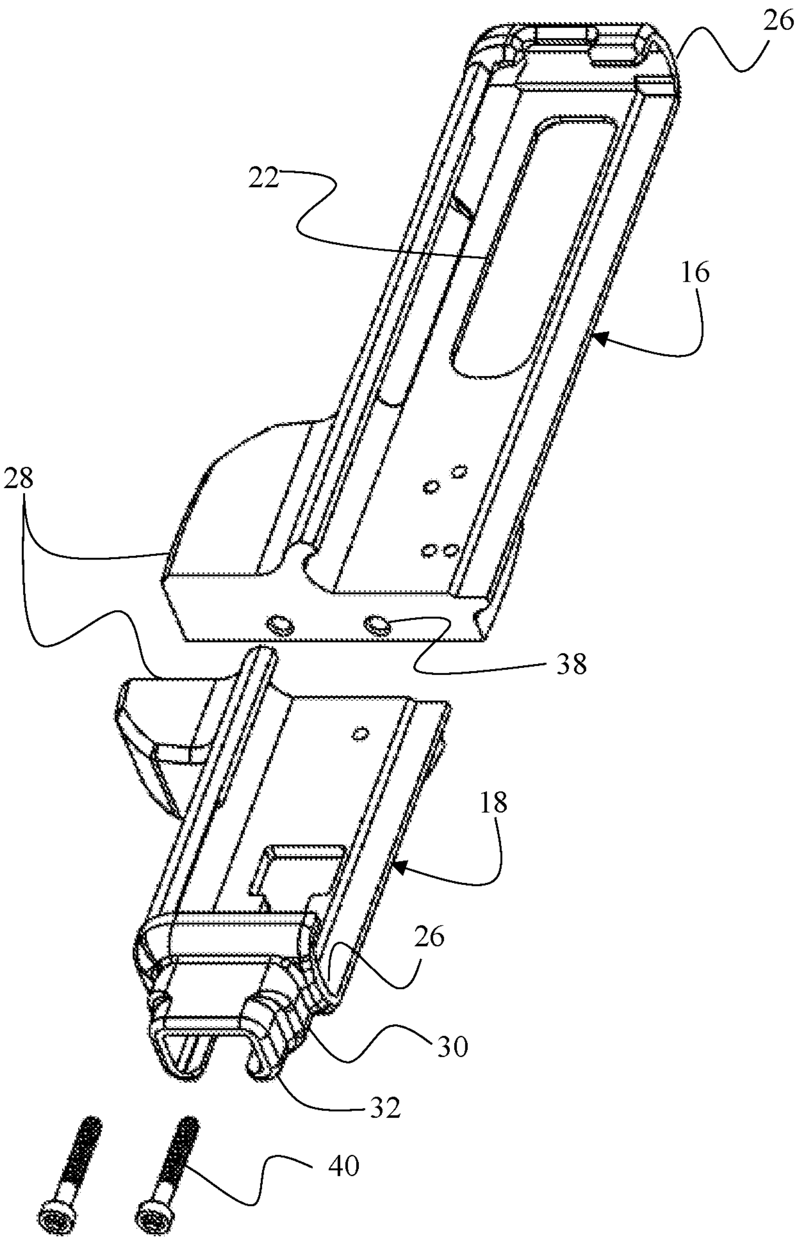
FIG. 2A is a perspective front view of the first embodiment of the bracket assembly in an uncoupled configuration.
Figure 2B:
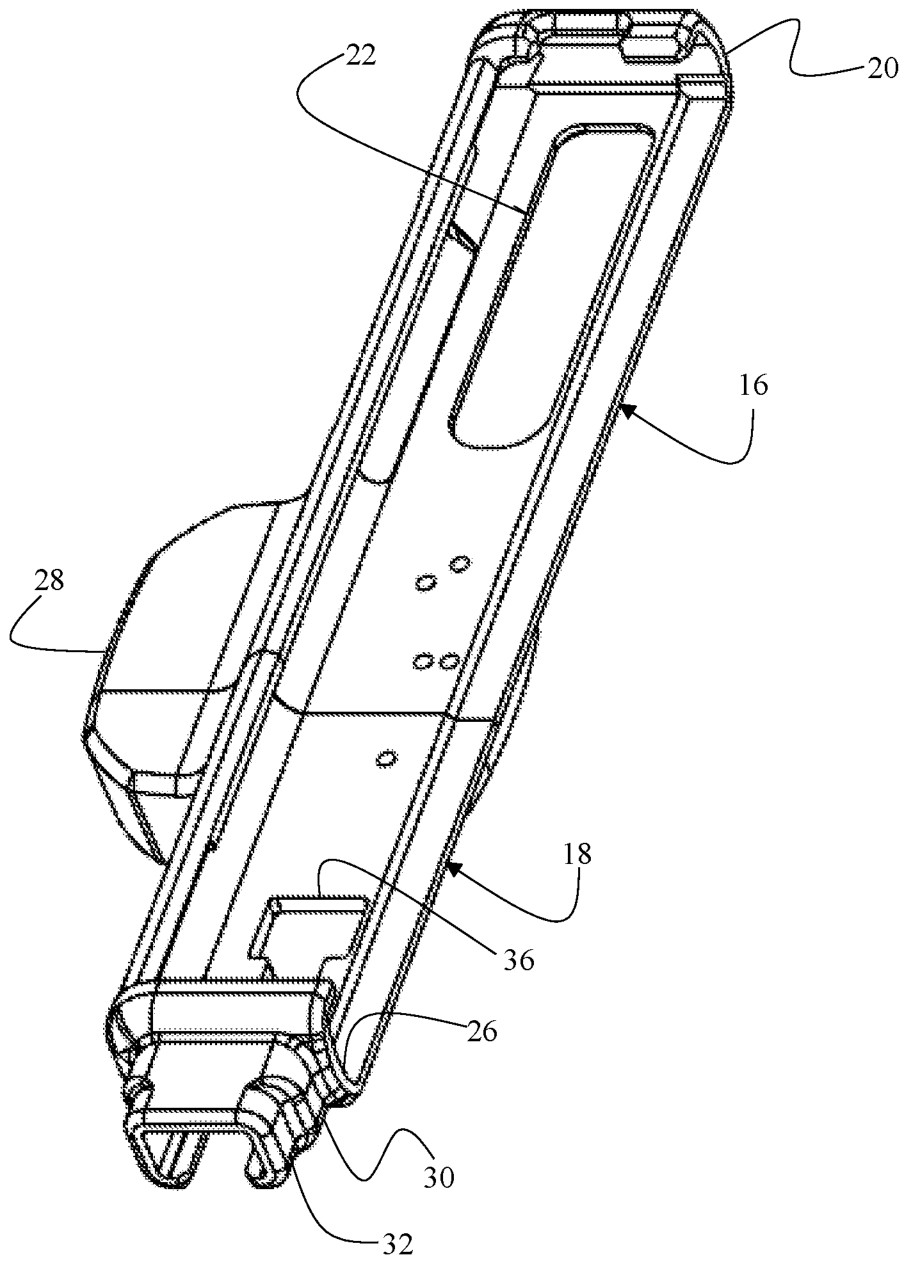
FIG. 2B is a perspective front view of the first embodiment of the bracket assembly in a coupled configuration.
Figure 3:
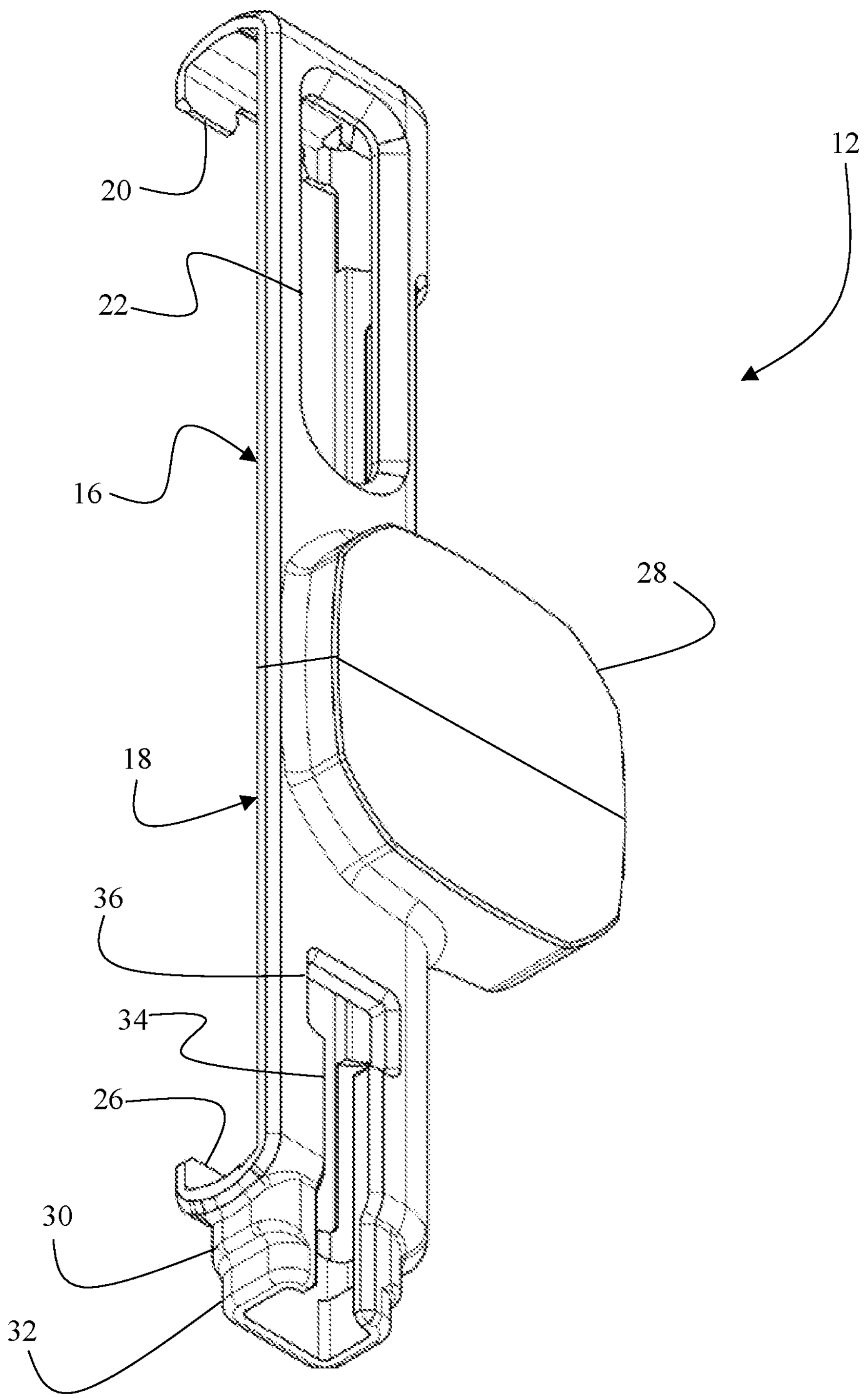
FIG. 3 is perspective back view of the first embodiment of the bracket assembly in a coupled configuration.

FIGS. 1-3 depict an embodiment of an anti-theft device having a two-part, non-obtrusive bracket assembly 12 configured to secure an article of merchandise 14—for example, a smartphone or a tablet. FIGS. 1A and 1B depict article of merchandise 14 having four lateral sides: top, bottom, left, and right. In the embodiment depicted in FIGS. 1A and 1B, bracket assembly 12 engages front and rear surfaces of article of merchandise 14 and, also, engages top, bottom, and left lateral sides of article of merchandise 14, while the right lateral side remains unobstructed.

In this embodiment, bracket assembly 12 comprises a first bracket member 16 and a second bracket member 18. First bracket member 16 has a lip 20. FIG. 1A depicts that lip 20 is configured to receive the top and left lateral sides of article of merchandise 14. When these lateral sides are positioned within lip 20, the edge of lip 20 engages the front surface of article of merchandise 14. FIG. 1A further depicts that lip 20 may have cutouts 21 configured to accommodate features of article of merchandise 14, such as a power button, volume rocker, a camera lens, a light emitting diode (LED), etc.

FIG. 1B depicts that first bracket member 16 has an aperture 22 configured to receive a protruding feature 24 of article of merchandise 14, for example a camera lens module. As explained in more detail below, when protruding feature 24 resides within aperture 22 of first bracket member 16, engagement between protruding feature 24 and aperture 22 immobilizes first bracket member 16 and article of merchandise 14 against movement relative to one another in the x-y plane (plane parallel to the front and back surfaces of article of merchandise 14).

FIG. 1A further depicts second bracket member 18 having a lip 26 configured to receive the portion of the left lateral side of article of merchandise 14 that is not secured by first bracket member 16. Lip 26 also receives the bottom lateral side of article of merchandise 14. In this embodiment, second bracket member 18 is configured to attach to article of merchandise 14 by capturing a power connector inserted into a power port thereof. This functionality is achieved due to second bracket member 18 having a recess 30 configured to receive the power connector. Furthermore, recess 30 may have a neck 32, which is sufficient to permit passage of a power cable but not the power connector. In this manner, the power connector is immobilized within recess 30 and cannot be disconnected from article of merchandise 14 when second bracket member 18 is attached thereto.

By immobilizing the power connector, bracket assembly 12 provides an additional securement point between article of merchandise 14 and bracket assembly 12. Attempts to remove article of merchandise from 14 from bracket assembly 12 while the power connector is positioned within recess 30 and plugged into article of merchandise 14 will result in extensive damage to article of merchandise 14, significantly diminishing its value. In other words, the power port retention feature is used both for physical securement and, also, as a means of theft deterrent through benefit denial.

As depicted in FIGS. 1A and 1B, when first bracket member 16 and second bracket member 18 are positioned onto article of merchandise 14, first bracket member 16 and second bracket member 18 are configured to be coupled together, forming bracket assembly 12. FIGS. 1A and 1B depict that bracket assembly 12 engages the rear and front surfaces of article of merchandise 14, thereby immobilizing article of merchandise 14 relative to bracket assembly 12 in the z-axis (the axis normal to the front surface of article of merchandise 14). Bracket assembly 12 also partially captures the top and the bottom lateral sides of article of merchandise 14, thereby immobilizing article of merchandise 14 against relative movement in a direction of the y-axis.

With respect to the relative movement in a direction of the x-axis, lip 20 and lip 26 of first and second bracket members 16 and 18 capture the left edge of article of merchandise 14, thereby immobilizing article of merchandise 14 against relative movement in the left direction of the x-axis. Finally, engagement between protruding feature 24 of article of merchandise 14 and aperture 22 of first bracket member 16 restrains relative movement of article of merchandise 14 relative to bracket assembly 12 in the x-y plane (including the right direction along the x-axis), without obstructing the right edge of article of merchandise 14. In the embodiment depicted in FIG. 1B, aperture 22 receives a protruding camera lens module positioned on the rear surface of article of merchandise 14. The precise engagement between the outer contour of protruding feature 24 and the inner contour of aperture 22 ensures that bracket assembly 12 cannot be removed from article of merchandise 14 through application of a force in the x-y plane. In addition, engagement between power connector and recess 30 further secures bracket assembly 12 to article of merchandise 14 in the direction of the x-axis.

FIGS. 1A and 1B depict that first bracket member 16 and second bracket member 18 have complementary features that interface together forming a mounting block 28. Mounting block 28 may be used to anchor bracket assembly 12 to a designated pedestal positioned within the retail store. In this manner, bracket assembly 12 securely attaches article of merchandise 14 to a display counter. As explained above, article of merchandise 14 cannot be removed from bracket assembly 12 without decoupling first bracket member 16 and second bracket member 18 from one another. When bracket assembly 12 is attached to a pedestal, the fasteners coupling first bracket member 16 and second member 18 may be concealed and/or may require a specialized tool, thereby providing an additional layer of security.

FIG. 2A depicts first bracket member 16 and second member 18 in a decoupled configuration. Because bracket assembly 12 comprises two separate bracket members, each bracket member can be placed onto the merchandise independently, enabling aperture to be positioned over protruding feature 24 and lip 20 to receive the top lateral of article of merchandise 14, while lip 26 receives the bottom lateral side. After first bracket member 16 and second bracket member 18 are independently positioned onto article of merchandise 14, their mating surfaces abut one another, enabling them to be coupled together, as depicted in FIG. 2B. In an embodiment, first bracket member 16 and/or second member 18 may have threaded holes 38 configured to receive fasteners 40 therein, thereby securely coupling first and second bracket members 16 and 18 together, thereby forming bracket assembly 12.

FIG. 3 depicts a perspective rear view of bracket assembly 12. This view shows a slot 34 and an opening 36 disposed within second bracket member 18. Opening 36 is structured to be sufficiently large to permit passage of the power connector therethrough, while slot 34 permits the power connector to enter recess 30, wherein the power connector is secured within recess 30 by neck 32. In a decoupled configuration, second bracket member 18 can be attached to article of merchandise 14 by aligning second bracket member 18 with article of merchandise 14 in the direction of x-axis and then sliding article of merchandise 14 downward relative to second bracket member 18, such that the power connector enters the corresponding power port of article of merchandise 14. At this point, second bracket member 18 is immobilized relative to article of merchandise 14 against relative movement. Neck 32 of recess 30 ensures that the power connector cannot be unplugged from article of merchandise 14 while second member 18 remain coupled thereto.

After bracket members 16 and 18 are positioned to capture their respective features, bracket members 16 and 18 are coupled together using fasteners, adhesive, or any other coupling means known in the art. After brackets members 16 and 18 are coupled together, article of merchandise 14 is immobilized against movement in all directions relative to bracket assembly 12. In this manner, article of merchandise 14 cannot be removed from bracket assembly 12 until first and second bracket members 16 and 18 are separated from one another.

Figure 4A:
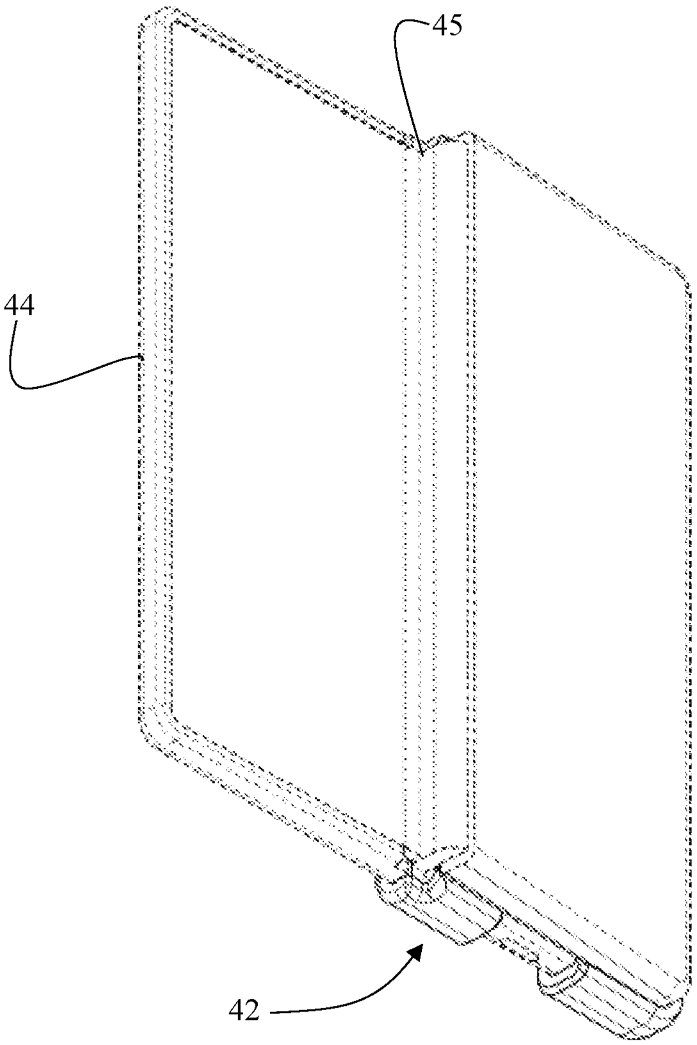
FIG. 4A is a perspective front view of a second embodiment of the anti-theft device securing an article of merchandise.
Figure 4B:
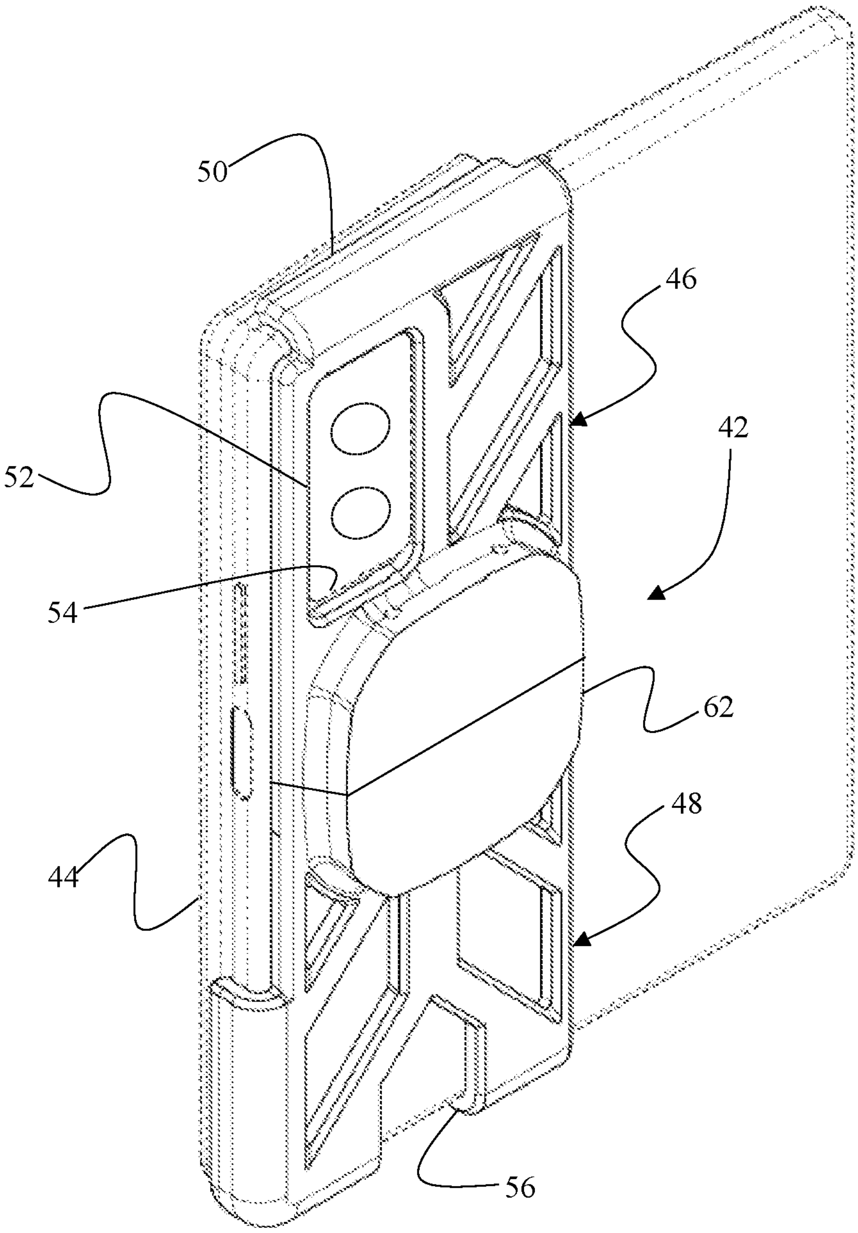
FIG. 4B is a perspective back view of the second embodiment the anti-theft device securing the article of merchandise.
Figure 5A:
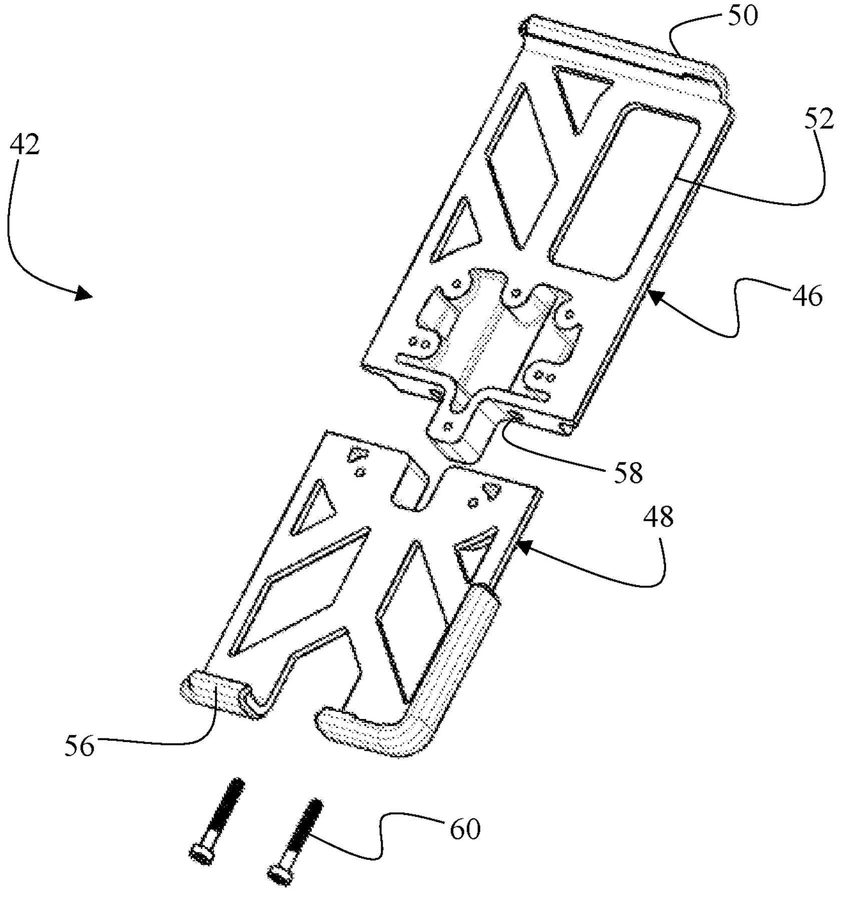
FIG. 5A is a perspective front view of the second embodiment of the bracket assembly in an uncoupled configuration.
Figure 5B:
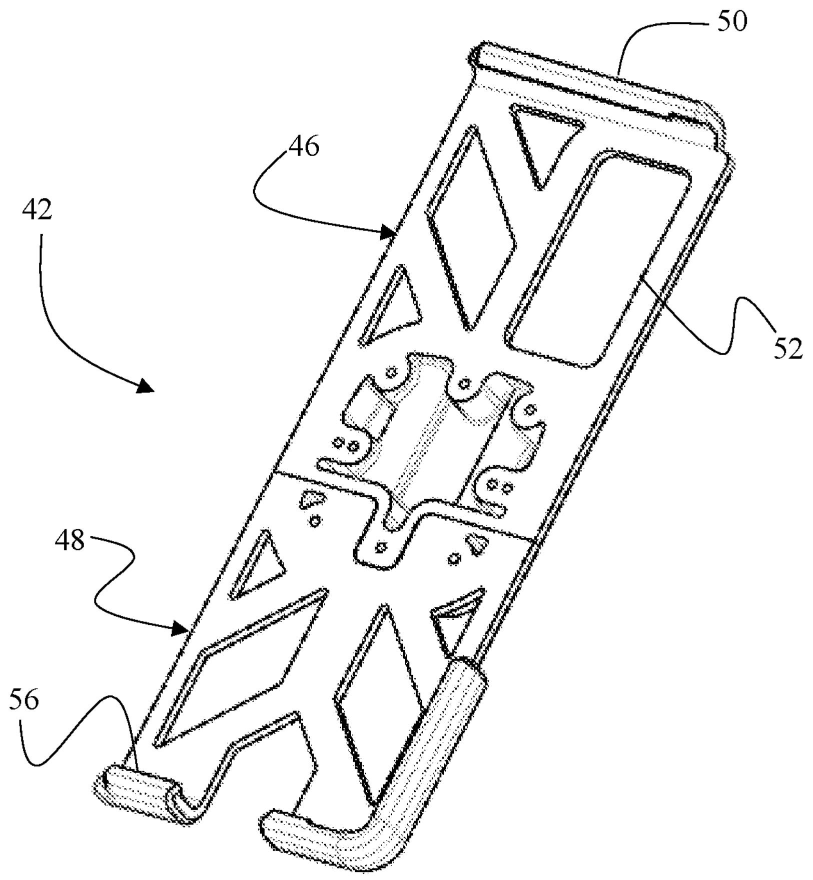
FIG. 5B is a perspective front view of the second embodiment to of the bracket assembly in a coupled configuration.

FIGS. 4-6 depict another embodiment of the anti-theft bracket. FIGS. 4A and 4B depict that, in this embodiment, bracket assembly 42 is configured to secure a foldable article of merchandise 44—for example, a foldable smartphone. To allow article of merchandise 44 to close and open, bracket assembly 42 must not obstruct, or otherwise interfere with, a hinge 45 positioned at the left lateral side of article of merchandise 44. For this reason, bracket assembly 42 captures only the right, the top, and the bottom lateral sides of article of merchandise 44, leaving the left lateral side unobstructed.

Analogously to the explanation provided for the embodiment depicted in FIGS. 1-3, to effectively secure article of merchandise 44, bracket assembly 42 must immobilize article of merchandise 44 against all relative movement in relation thereto. To that end, bracket assembly 42 comprises a first bracket member 46 having a lip 50 configured to receive the top lateral side of article of merchandise 44. Lip 50 has an edge configured to engage the front surface of article of merchandise 44 when first bracket member 46 is positioned thereon. Thus, because first bracket member 46 simultaneously engages the front and the rear surfaces of article of merchandise 44, first bracket member 46 immobilizes article of merchandise 44 against relative movement in the direction of the z-axis. First bracket member 46 further comprises an aperture 52 configured to receive a protruding feature 54 of article of merchandise 44. Engagement between aperture 52 and protruding feature 54 immobilizes article of merchandise 44 against relative movement in the x-y plane relative to first bracket member 46.

Bracket assembly 42 further comprises second bracket member 48. Second bracket member 48 has a lip 56 configured to receive the bottom and right lateral sides of article of merchandise 44. In this manner, second bracket member 48 immobilizes article of merchandise 44 against relative movement in the downward direction along the y-axis and the right direction along the x-axis.

FIG. 5A depicts a decoupled configuration of bracket assembly 42. To secure article of merchandise 44, first bracket member 46 and second bracket member 48 must be positioned onto article of merchandise 44 independently. First bracket member 46 is positioned such that lip 50 receives the top lateral side of article of merchandise 44 and aperture 52 receives protruding feature 54. Second bracket member 48 is positioned such that lip 56 receives the bottom lateral side and right lateral side of article of merchandise 44. At this point, mating edges of first bracket member 46 and second bracket member 48 contact one another and can be coupled together, using one or more fasteners, adhesive, electromagnets, or any other coupling means known in the art. To that end, first bracket member 46 and/or second bracket member 48 may include threaded holes 58 configured to receive fasteners 60.

After first bracket member 46 and second bracket member 48 are coupled together, article of merchandise 44 is immobilized within bracket assembly 42. Edges of lip 50 and lip 56 engage front surface of article of merchandise 44, thereby immobilizing article of merchandise against movement relative to bracket assembly 42 in the direction of z-axis. Likewise, because lip 50 and lip 56 engage top and bottom lateral edges of article of merchandise 44, article of merchandise 44 is immobilized against relative movement in the direction of y-axis. Finally, bracket assembly 42 immobilizes article of merchandise 44 against relative movement in the x-y plane by capturing protruding feature 54 of article of merchandise 44 into aperture 52. In this manner, bracket assembly 42 is configured to secure article of merchandise 44 without interfering with the functionality of hinge 45.

FIG. 4B further depicts that bracket assembly 42 may include a mounting block 62. After article of merchandise 44 is secured within bracket assembly 42, mounting block 48 can be coupled to a pedestal for display in a retail environment. Because bracket assembly 42 is designed to capture protruding feature 56 (or a cavity/port) of article of merchandise 44, bracket assembly 42 does not need to capture all lateral sides of article of merchandise 44. In this manner, bracket assembly 42 enables attractive and non-obtrusive presentation of article of merchandise 44, without interfering with its functionality. Furthermore, because bracket assembly 42 leaves at least one lateral side of article of merchandise 44 unobstructed, bracket assembly 42 does not interfere with the folding, rolling, or sliding functionality of the merchandise.

Figure 6A:
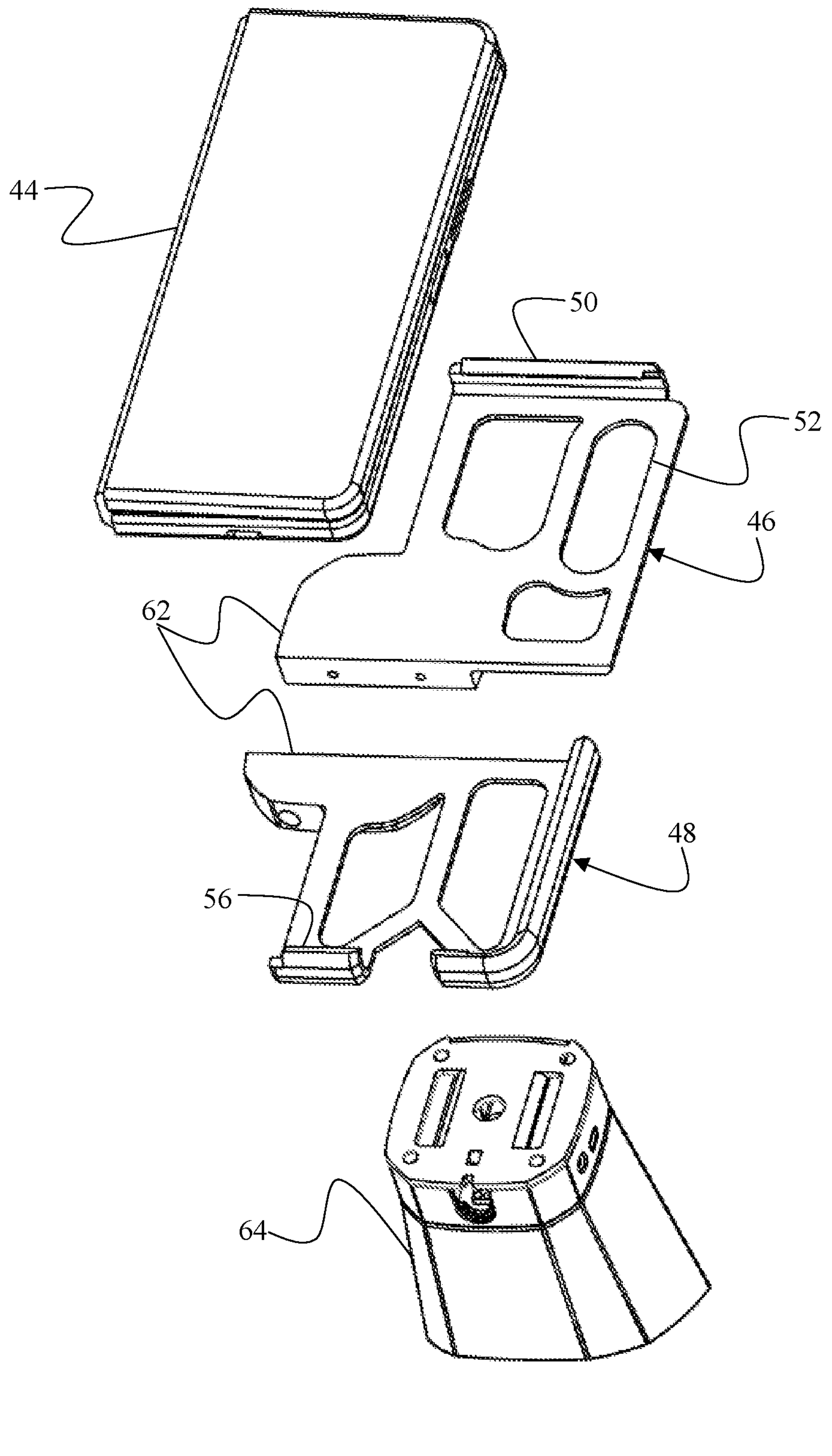
FIG. 6A is a perspective front view depicting an uncoupled configuration of a bracket assembly with an offset mounting platform.
Figure 6B:
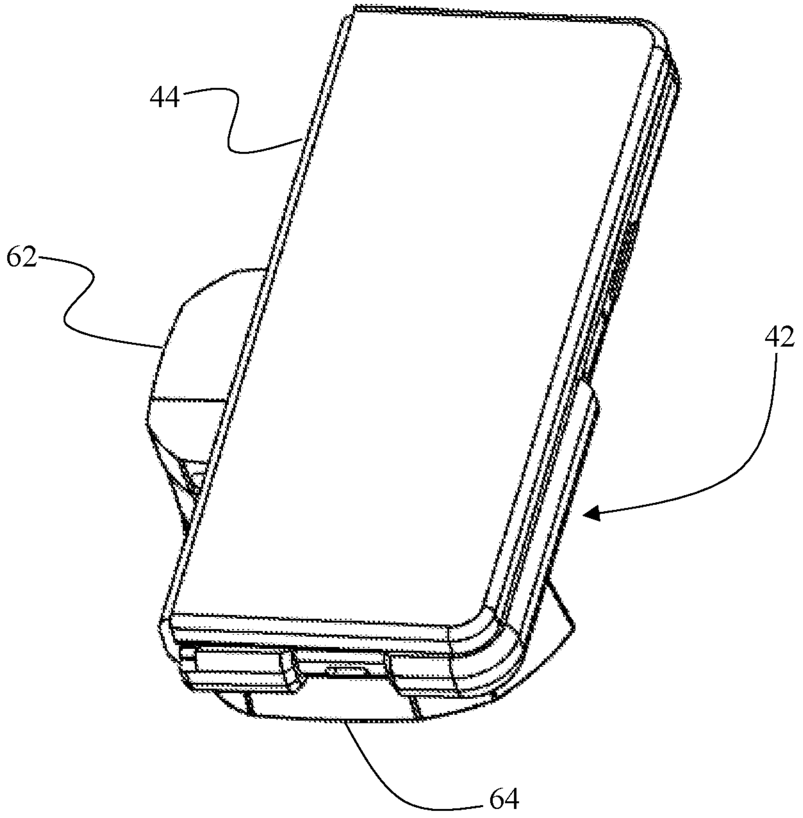
FIG. 6B is a perspective front view depicting an article of merchandise in a closed configuration mounted to a pedestal via the offset mounting block.
Figure 6C:
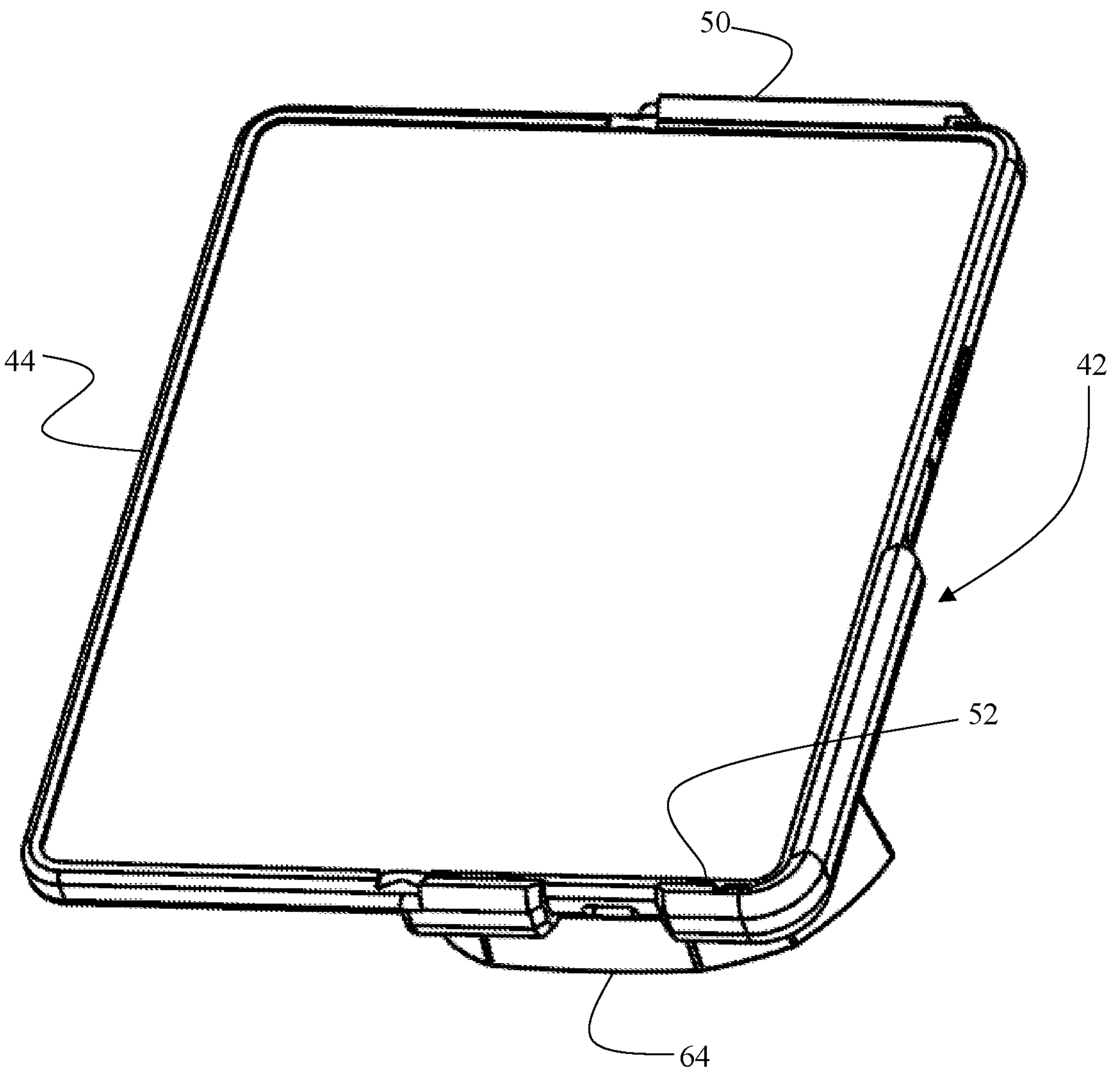
FIG. 6C is a perspective front view depicting the article of merchandise in an unfolded configuration centrally positioned relative to the pedestal.

FIG. 4B depicts that mounting block 62 is centered relative to bracket assembly 42. This configuration enables article of merchandise 44 to be displayed in a centered configuration relative to the pedestal when article of merchandise 44 is in a closed configuration. FIGS. 6A-6C depict a variant of bracket assembly 42, in which mounting block 62 is offset relative bracket assembly 42. This embodiment is configured to mount article of merchandise 44 relative to pedestal 64 in a position that centers article of merchandise 44 relative to pedestal 64 when article of merchandise 44 is in its unfolded configuration, as depicted in FIG. 6C. In this manner, store personnel may select a variant of bracket assembly 42 based on the display preferences and needs of a specific retail store.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:

a first bracket member having a first lip, wherein the first lip is configured to at least partially receive a first lateral side of the article of merchandise such that the first bracket member contacts both a back surface and a front surface of the article of merchandise;

a first aperture disposed within the first bracket member, the first aperture configured to receive a protruding feature of the article of merchandise therein;

a second bracket member having a second lip, wherein the second lip is configured to receive a second lateral side of the article of merchandise therein such that the second bracket member contacts both the back surface and the front surface of the article of merchandise, the second lateral side of the article of merchandise being opposite the first lateral side of the article of merchandise;

wherein the first bracket member is configured to couple to the article of merchandise by receiving the first lateral side thereof into the first lip and receiving the protruding feature of the article of merchandise into the first aperture, and wherein the second bracket member is configured to couple to the article of merchandise by receiving the second lateral side of the article of merchandise into the second lip, the first and the second bracket members are configured to be coupled together forming a bracket assembly, whereby the bracket assembly receives the first and the second lateral sides of the article of merchandise while a third lateral side and two corners remain unobstructed by the bracket assembly;

wherein the engagement between the first aperture and the protruding feature of the article of merchandise precludes movement of the article of merchandise relative to the bracket assembly in a direction of the third lateral side, thereby immobilizing the article of merchandise within the bracket assembly; and wherein to release the article of merchandise from the bracket assembly, the first and the second bracket members must be disconnected from one another.

2. The anti-theft device of claim 1, wherein the at least one of the third lateral sides must remain unobstructed by the bracket assembly to enable the article of merchandise to transition between a closed configuration and an opened or expanded configuration.

3. The anti-theft device of claim 1, further comprising a fastener configured to retain the first and the second bracket members coupled to one another.

4. The anti-theft device of claim 1, wherein the protruding feature of the article of merchandise is a camera lens module.

5. The anti-theft device of claim 1, wherein the first bracket member or the second bracket member comprises an opening configured to receive a cable coupled to the article of merchandise.

6. The anti-theft device of claim 1, wherein the first bracket member comprises a first mounting block component and the second bracket member comprises a second mounting block component, wherein the first and the second mounting block components collectively form a mounting block assembly when the first and the second bracket members are coupled together, and wherein the mounting block assembly is configured to be coupled to a pedestal.

7. The anti-theft device of claim 6, wherein the first mounting block component or the second mounting block component comprises a screw-threaded opening configured to receive a fastener, the fastener retaining the first mounting block component and the second mounting block component in a coupled configuration relative to one another.

8. The anti-theft device of claim 6, wherein the mounting block assembly is off-center relative to the bracket assembly, such that the article of merchandise in the open configuration is centered relative to the pedestal and off-centered in the closed configuration.

9. An anti-theft device for securing an article of merchandise, comprising:

a bracket assembly having a first bracket member and a second bracket member, the first bracket member and the second bracket member being configured to engage a rear surface of the article of merchandise;

a first lip disposed on the first bracket member, wherein a first edge of the first lip is configured to engage a front surface of the article of merchandise;

a first aperture disposed within the first bracket member, the first aperture configured to receive a protruding feature of the article of merchandise;

a second lip disposed on the second bracket member, wherein a second edge of the second lip is configured to engage the front surface of the article of merchandise;

wherein the article of merchandise has a hinge disposed along a lateral side thereof for transitioning the article of merchandise between an open configuration and a closed configuration, and wherein when the article of merchandise is secured within the bracket assembly, the binge is unobstructed such that the article of manufacture is transitionable between the open and the closed configurations via operation of the hinge; and wherein to release the article of merchandise from the bracket assembly, the first and the second bracket members must be disconnected from one another.

10. The anti-theft device of claim 9, further comprising a fastener configured to retain the first and the second bracket members coupled to one another.

11. The anti-theft device of claim 9, wherein the protruding feature of the article of merchandise is a camera lens module.

12. The anti-theft device of claim 9, wherein the first bracket member or the second bracket member comprises an opening configured to receive a cable coupled to the article of merchandise.

13. The anti-theft device of claim 9, wherein the first bracket member comprises a first mounting block component and the second bracket member comprises a second mounting block component, wherein the first and the second mounting block components collectively form a mounting block assembly when the first and the second bracket members are coupled together, and wherein the mounting block assembly is configured to be coupled to a pedestal.

14. The anti-theft device of claim 13, wherein the first mounting block component or the second mounting block component comprises a screw-threaded opening configured to receive a fastener, the fastener retaining the first mounting block component and the second mounting block component in a coupled configuration relative to one another.

15. The anti-theft device of claim 13, wherein the mounting block is off-center relative to the bracket assembly, such that the article of merchandises in the open configuration is centered relative to the pedestal and off-centered in the closed configuration.

16. An anti-theft device for securing an article of merchandise, comprising:

receiving a first bracket member having a first lip configured to receive a first lateral side of the article of merchandise and a first aperture configured to receive a protruding feature of the article of merchandise;

placing the first bracket member onto the article of merchandise, such that the first lateral side of the article of merchandise is received into the first lip and the first protruding feature of the article of merchandise is received into the first aperture;

receiving a second bracket member having a second lip configured to receive a second lateral side of the article of merchandise therein;

placing the second bracket member onto the article of merchandise such that the second lateral side of the article of merchandise is received into the second lip; and coupling the first bracket member and the second bracket member to one another, thereby forming a bracket assembly, wherein the article of merchandise has a hinge disposed on a third lateral side thereof and wherein the bracket assembly is configured to leave the hinge unobstructed, such that the article of manufacture is transitionable between the open and the closed configurations via operation of the hinge, and wherein to release the article of merchandise from the bracket assembly, the first and the second bracket members must be disconnected from one another.

* * * * *